March 17, 1970     P. LIPPKE     3,500,999
PNEUMATIC CONVEYOR FOR DEPOSITING SHEETS Filed July 24, 1967     11 Sheets-Sheet 1

INVENTOR
Paul Lippke

March 17, 1970 P. LIPPKE 3,500,999
PNEUMATIC CONVEYOR FOR DEPOSITING SHEETS
Filed July 24, 1967 11 Sheets-Sheet 4

INVENTOR
Paul Lippke

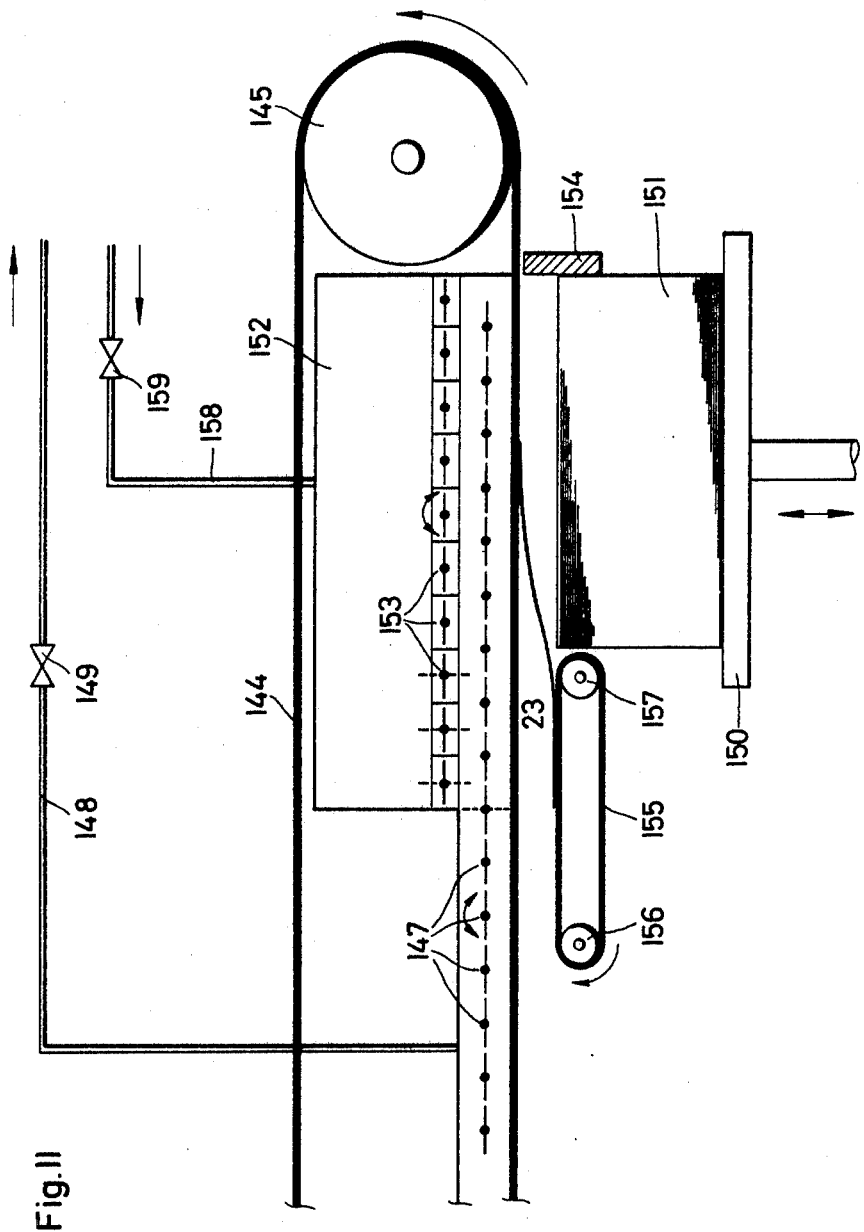

United States Patent Office 3,500,999
Patented Mar. 17, 1970

3,500,999
PNEUMATIC CONVEYOR FOR DEPOSITING SHEETS
Paul Lippke, Neuwied (Rhine), Germany
Filed July 24, 1967, Ser. No. 655,518
Claims priority, application Germany, July 22, 1966,
L 54,142
Int. Cl. B07c 5/34; B65h 29/32, 29/58
U.S. Cl. 209—74                                    21 Claims

ABSTRACT OF THE DISCLOSURE

Method of and apparatus for conveying sheet-like members in which a pervious belt-like member forms the conveyor and is subjected to suction on the side opposite the members to be conveyed for holding the members on the belt, while the members are released to a receiving station past which the belt moves by reducing the suction applied to the belt within the range of the receiving station.

---

The present invention relates to a method and an apparatus for conveying and depositing sheets of papers, carton, metal foils and the like. The present invention also includes a method and device for conveying and sorting sheets of paper, carton, metal foils and the like.

When producing sheets from webs of paper, carton or the like in sheet producing machines as, for instance, in so-called transverse cutters, there exists the problem of combining the individual sheets in such a way that they will be suitable for the subsequent transport. To this end, it is customary to convey the sheets to an assembly table where the sheets are aligned by means of special devices. Also, with other sheet producing machines, as, for instance, punching presses or sheet feeders, the said problem is solved in the same way.

Heretofore, the sheets produced by transverse cutters are grasped by a conveyor comprising a number of circulating belts or chains and are conveyed thereby to a depositing station.

These conveying devices, however, are able to convey at a limited speed only the sheets of papers which are ejected from the transverse cutter. The reason for this limited speed consists in that at higher speed of the belts or chains there exists the danger, especially with paper sheets having a low weight per surface, that the sheets are lifted and separated from each other by the wind encountered during the transportation of the paper sheets on said belts or chains. In view of such lifting off of the sheets, the sheets can easily be bent or otherwise be damaged and can no longer be stacked in the intended manner. With these conveying devices, the sheet ejecting machines must therefore operate at a relatively low speed. This is particularly disadvantageous in view of the fact that modern transverse cutters have a high output.

In order to improve the output of conveying devices of the above mentioned type, especially with lightweight papers, it has been suggested similar to the known conveying device to provide an additional conveying device comprising belts or chains or the like which is arranged above the first conveying device and the belt or chains of which are by means of guiding rollers brought into engagement with the sheets to be conveyed. These additional belts or chains engaging the sheets from above, move at the same speed as the lower belts or the like, and are intended to prevent the sheets from disengaging each other at higher speeds so that the conveying speed can be increased. While such an arrangement represents an improvement of the above described fundamental conveying device, it also requires a duplication of the equipment and therefore frequently makes the entire arrangement uneconomical.

A further disadvantage of the above mentioned conveying devices consists in that rather thin and less stiff papers can at high speed not be deposited in a satisfactory manner in view of the fact that the sheets when being deposited form undulations due to the frequently considerable electrostatic charge of the sheets.

It is, therefore, an object of the present invention to provide a method of and device for conveying and depositing sheets of papers, carton, metal foils and the like which will overcome the above mentioned drawbacks.

It is another object of this invention to provide a method and device as set forth above, which will greatly simplify the conveying and depositing of sheets and will also increase the field of application of the device over heretofore known conveying devices.

It is also an object of this invention to provide a method and device for simplifying the conveying and sorting of sheets and to permit a finer sorting.

These and other objects and advantages of the invention will appear more clearly from the following specification, in connection with the accompanying drawings, in which.

Figure 6:
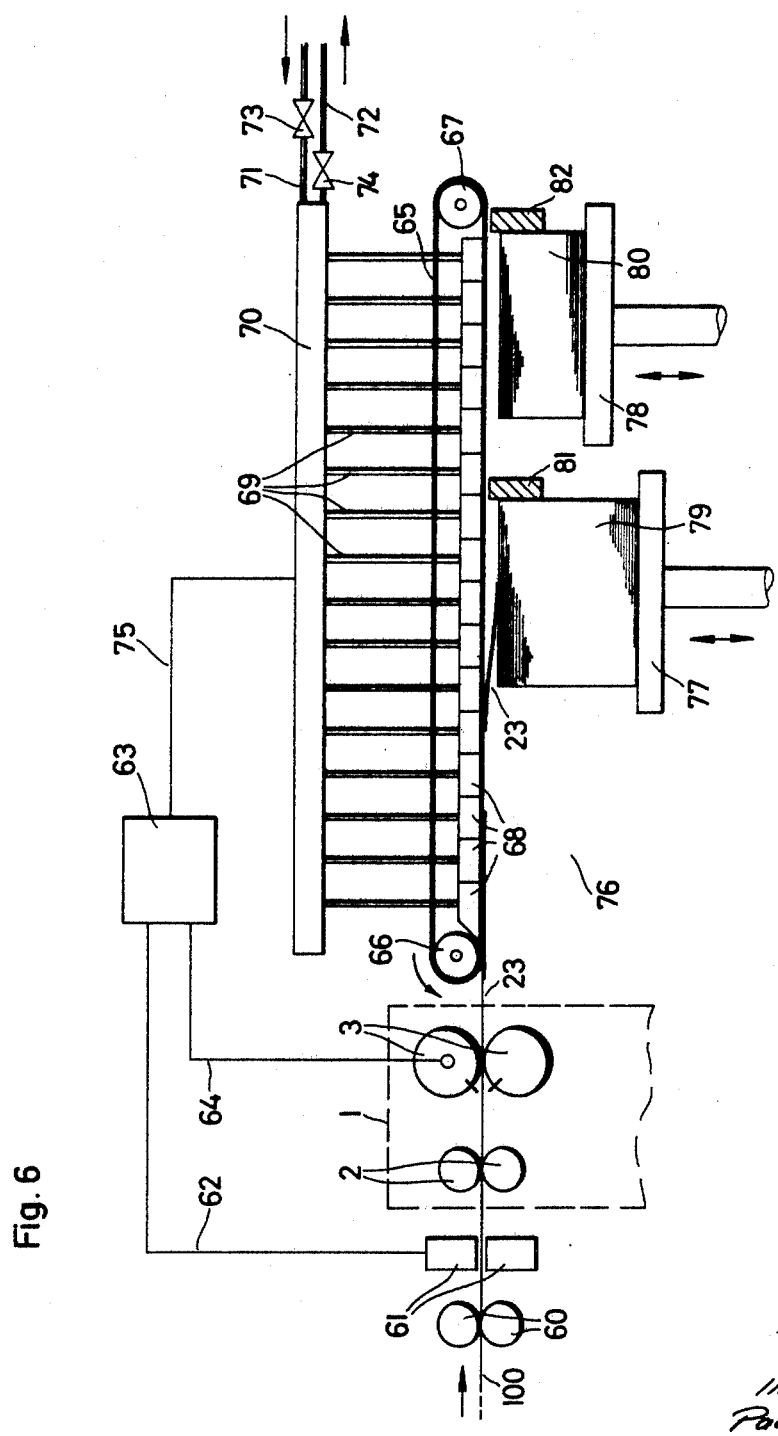

FIGURE 6 is a conveying device for conveying and sorting of sheets by means of an air permeable conveyor belt and a plurality of boxes which are open relative to the inside of one of the strands of said conveyor belt and are adapted to be subjected to different pressures; FIG. 6 also showing a checking device for the webs or sheets, which gives off impulses in conformity with which the pressure in said boxes is controlled.

Figure 7:
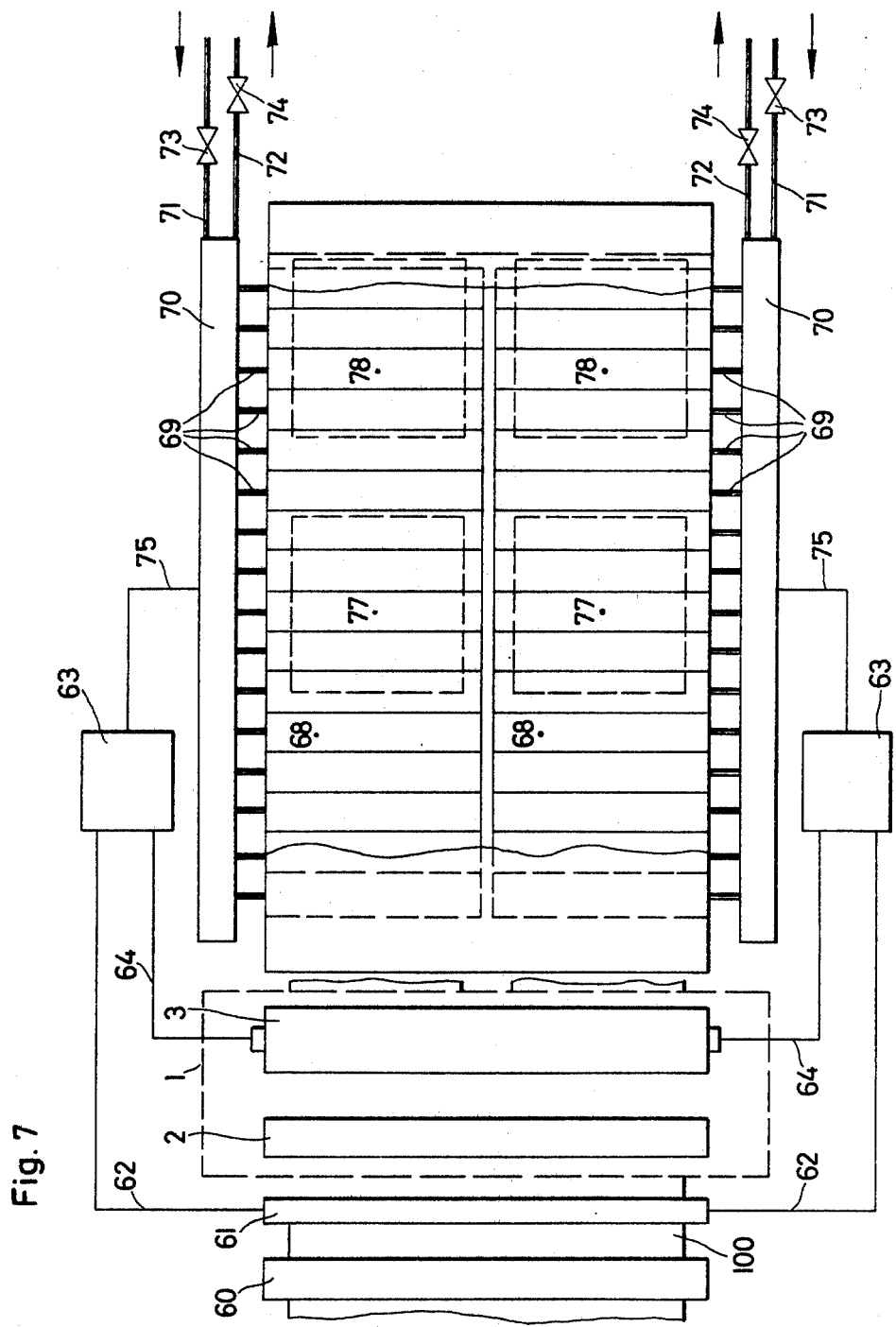

FIGURE 7 is a top view of the arrangement of FIG. 6.

Figure 8:
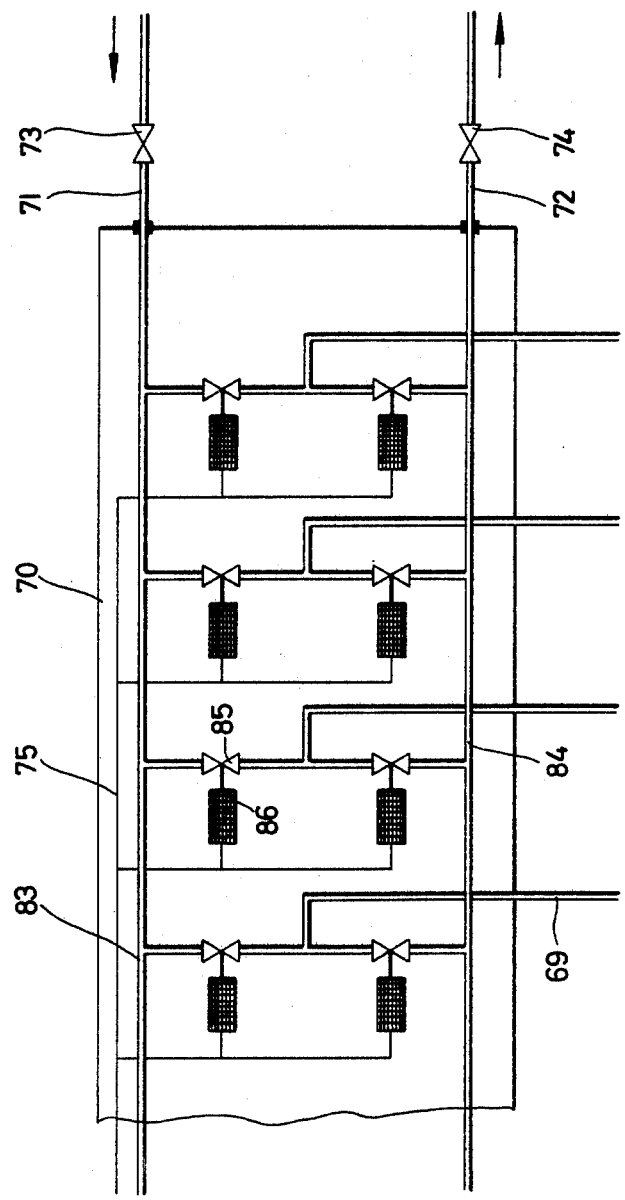

FIGURE 8 illustrates on a larger scale than FIGS. 6 and 7, a control device for controlling the pressure in the boxes above the conveyor belt in conformity with impulses given off by the checking device.

Figure 9:
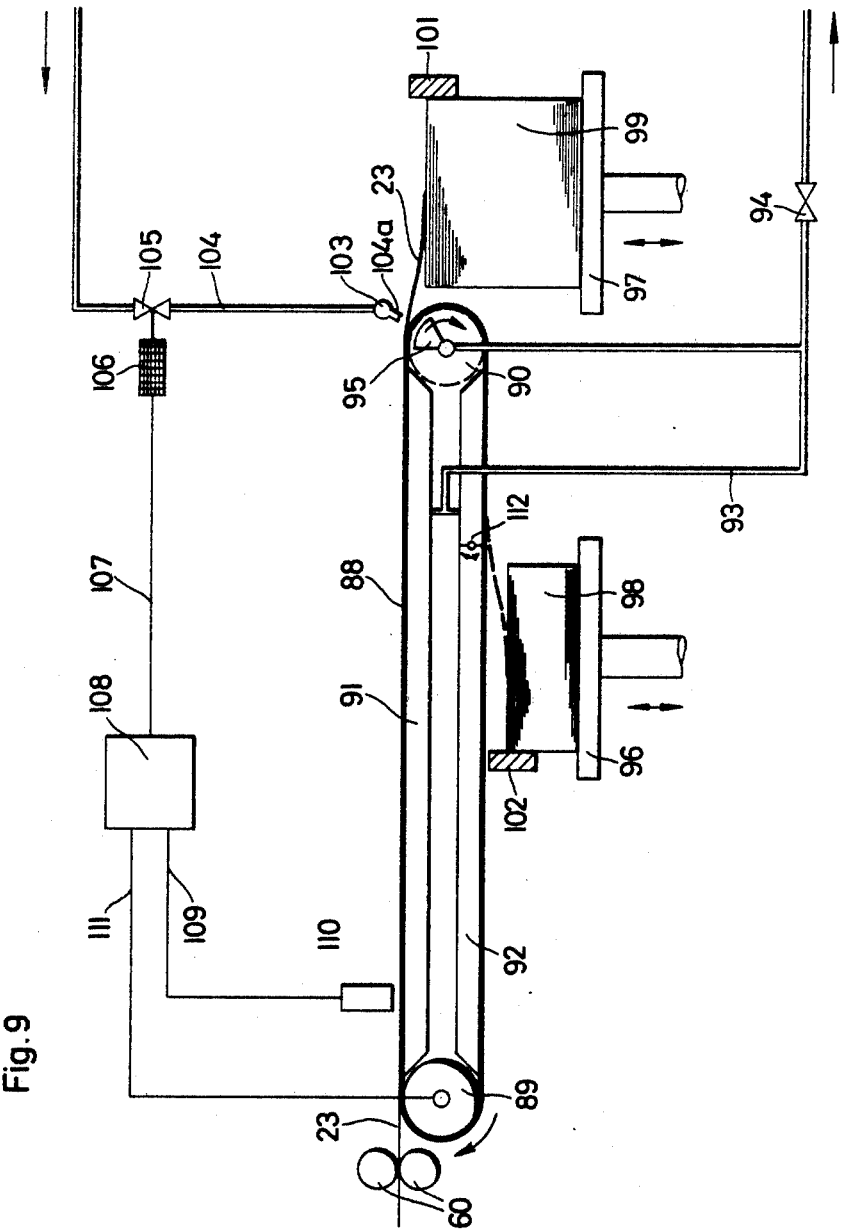

FIGURE 9 is a conveying device in which the sheets are conveyed on one or both of the strands of the conveyor belt, and in which the checking of the sheets is effected on the conveyor belt.

Figure 10:
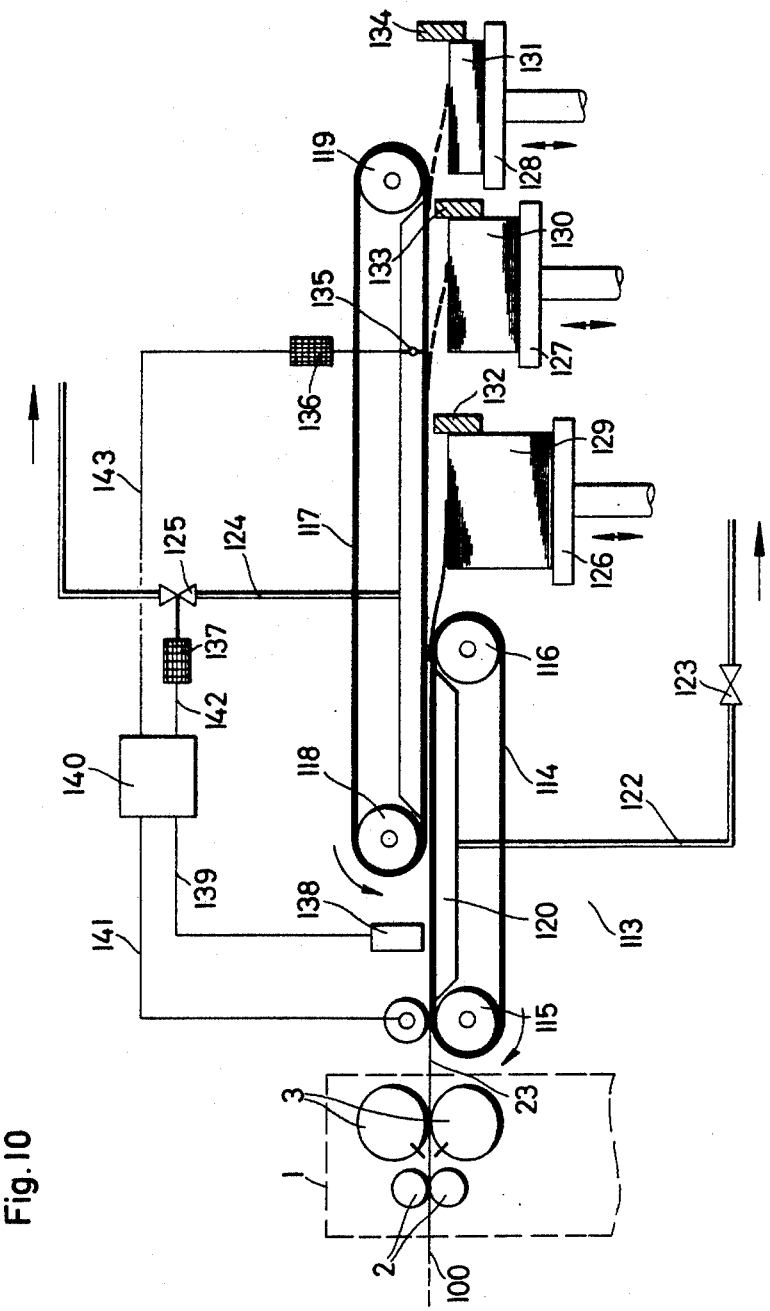

FIGURE 10 diagrammatically shows a conveying device which is particularly suitable for conveying and sorting and depositing of stiff sheets of carton, metal foils and the like.

FIGURE 11 shows a device for use in connection with a conveying device for braking the sheets at the depositing station and also shows a container for storing and releasing under control compressed air within the range of the depositing station.

The objects outlined above are realized according to the present invention by feeding the sheets to a device which holds said sheets fast under a unilaterally acting force while simultaneously conveying said sheets, and depositing said sheets at at least one depositing station while decreasing said force. According to a further development of the present invention, the sheets are conveyed to a device which holds fast the sheets under unilaterally acting force and after reducing said force, deposits the sheets at one of a plurality of depositing stations while the effect of said force is controlled by impulses of a checking device which checks the webs or sheets as to faults or markings. This arrangement overcomes a further drawback of heretofore known conveying devices which permit the depositing of the sheets at one single depositing station only while the location of the depositing station is pre-determined and fixed by the length of the conveying device. It will be appreciated that if with heretofore known devices of the type involved sheets for purposes of sorting have to be deposited, for instance, at two depositing stations it was necessary to employ two separated conveying devices and a so-called sheet switch by means of which the sheets are guided to one or the other conveying device. Such heretofore known device is particularly difficult and hard to check when it is intended to arrange and guide the belts or chains above the sheets.

According to a further feature of the present invention, and in particular the method of the present invention, the sheets are within the range of a depositing station additionally subjected to the effect of a force which equals or approximately equals the gravitational force. This is particularly advantageous when very light or thin papers are to be deposited, and when it is intended to operate at high conveying speeds.

According to a particular feature of the method according to the invention for conveying and sorting, it is advantageous to effect the checking of the sheets on the device which holds the sheets fast under unilateral force and conveys the same.

In order to be able during the checking operation to recognize faulty sheets in a shorter time and in an easier manner, it is advantageous to pre-mark such sheets or the corresponding part of the web from which the sheets are produced. This may be effected for instance, by spraying dyes on the sheets or stacking markers thereon which will distinguish from the surrounding paper, optically, mechanically, or electrically.

When dealing with sheets which are conveyed at high speed, and in particular heavy sheets, it may be advantageous to brake the sheets prior to or when being deposited on the stack, so that damage to the sheets by abutting the stack will be prevented, and on the other hand, a precise depositing operation will be assured.

The device for carrying out the method according to the invention, i.e. for conveying and depositing sheets of paper, carton, metal foils or the like, comprises a device for holding fast, conveying and depositing sheets by means of an air permeable endless conveyor belt which passes over boxes or the like which are closely arranged on the inside of the conveyor belt and are open toward said conveyor belt while said boxes are subjected to underpressure.

The device for carrying out the method of conveying and sorting sheets of paper, carton, metal foils or the like, is according to the invention characterized in that for purposes of holding fast conveying and sorting the sheets, there is provided an air permeable endless conveyor belt which passes over boxes or the like which are closely arranged on the inside of said conveyor belt and are open toward the same and are subjected to at least an underpressure. The said underpressure is controlled by impulses of a testing device which tests the webs or sheets at least from one side as to faults or markings. As air permeable conveyor belt there may be employed a screen cloth or the like.

In order to prevent an electrostatic charging of the sheets, the screen cloth consists at least partially of metallic threads or the like. In order to be able to expose the sheets within the range of a depositing station additionally to a force equalling or approximately equalling the force of gravity, the boxes arranged within the range of a depositing station are adapted to be subjected to an overpressure.

It is also advantageous so to arrange the boxes within the range of depositing stations that the said boxes can be subjected to over or underpressure in order to vary the position of the depositing station for the sheets.

Figure 1:
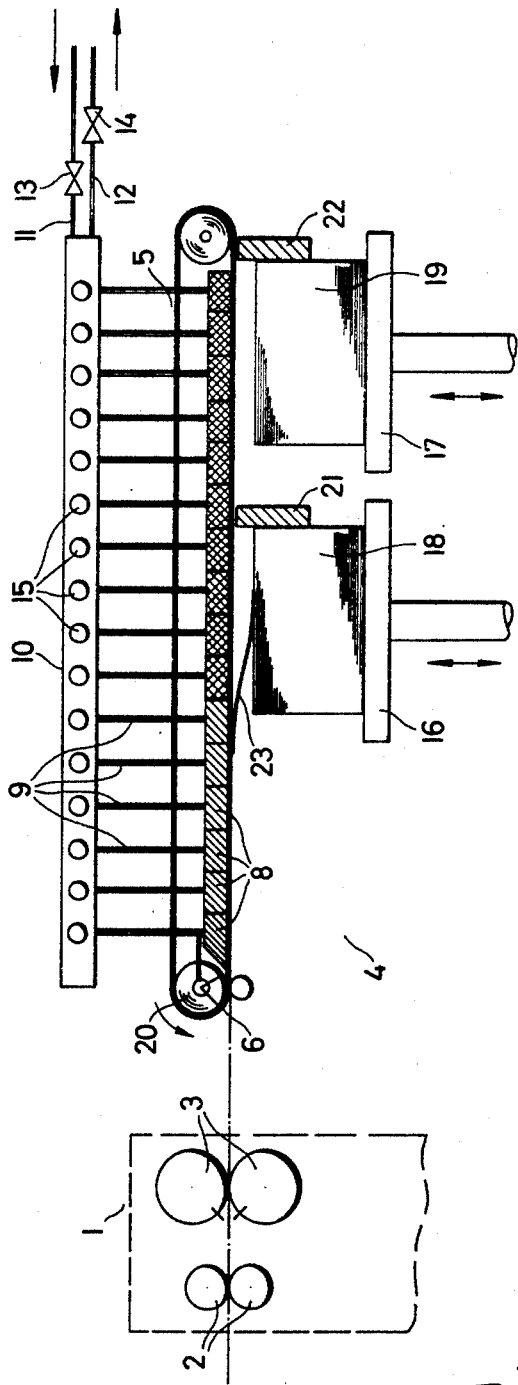
FIGURE 1 is a diagrammatic illustration of a conveying device for conveying and depositing sheets by means of an air permeable conveyor belt and a plurality of boxes which are open with regard to the inner side of one strand of the conveyor belt and are subjected to different pressures.

Referring now to the drawings in detail: FIG. 1 diagrammatically illustrates a transverse cutter with the drawing in rollers 2 and the cutter rollers 3. In the vicinity of the cutter rollers 3 a conveying device 4 is arranged on that side which furnishes the sheets. The conveying device 4 comprises an air permeable conveyor belt 5, rollers 6 and 7 and a plurality of boxes 8. The boxes 8 are fixedly arranged close to the inner side of the lower strand of the conveyor belt 5. From boxes 8, conduits 9 lead to the control device 10. The control device 10 is through the intervention of conduits 11 and 12 connected to valves 13 and 14 and through the latter connected to air under suction and air under pressure respectively. The control device 10 comprises operating means 15 respectively associated to the various conduits 9, by means of which the pressure is adjustable in the respective boxes 8 pertaining thereto. Below the lower strand of the conveyor belt 5 there are diagrammatically illustrated depositing tables 16 and 17 with stacks 18 and 19 respectively. The air permeable roller 6 of the conveyor belt 5 which faces the cutter rollers 3 is likewise subjected to an underpressure. In this roller 6 there is provided a segment 20 for covering a portion of the mantle surface.

The depositing tables 16 and 17 are preferably infinitely variable or adjustable as to height. The depositing tables 16 and 17 comprise abutments 21, 22 for the sheets 23 which form the stacks 18 and 19.

The arrangement shown in FIG. 1 operates in the following manner: The sheets 23 released from the cutter rollers 3 are grasped by the conveyor belt 5 and are conveyed. By a corresponding adjustment of the control device 10 by means of the operating handles 15, it is possible to produce an underpressure for instance, in the boxes which are shown hatched in one direction, whereas an overpressure exists in the crosswise hatched boxes 8. A sheet 23 conveyed by the conveyor belt 5 will thus drop off the conveyor belt 5 within the range of the boxes 8 subjected to underpressure and will slide over onto the stack 18. The abutment 21, 22 serves for limiting the movement of the sheets 23. In view of the overpressure produced by the boxes 8 within the range of the depositing table 16 or the stack 18, the depositing of a sheet 23 on stack 18 will be accelerated and will be considerably improved, especially with thin or lightweight papers. By correspondinly adjusting the controlling device 10 it will be possible to bring about that the sheets 23 are deposited on the further depositing table 17. To this end, the control device 10 may be so designed that the shifting over for feeding to and depositing on the second conveyor table 17 will be effected by means of a single manual operation.

In this way it is possible to have to interrupt the operation of the transverse cutter 1 so that in contrast to heretofore known conveying devices the customary dead time will not occur which in turn will bring about a better exploitation of the capacity of the transverse cutter.

Figure 2:
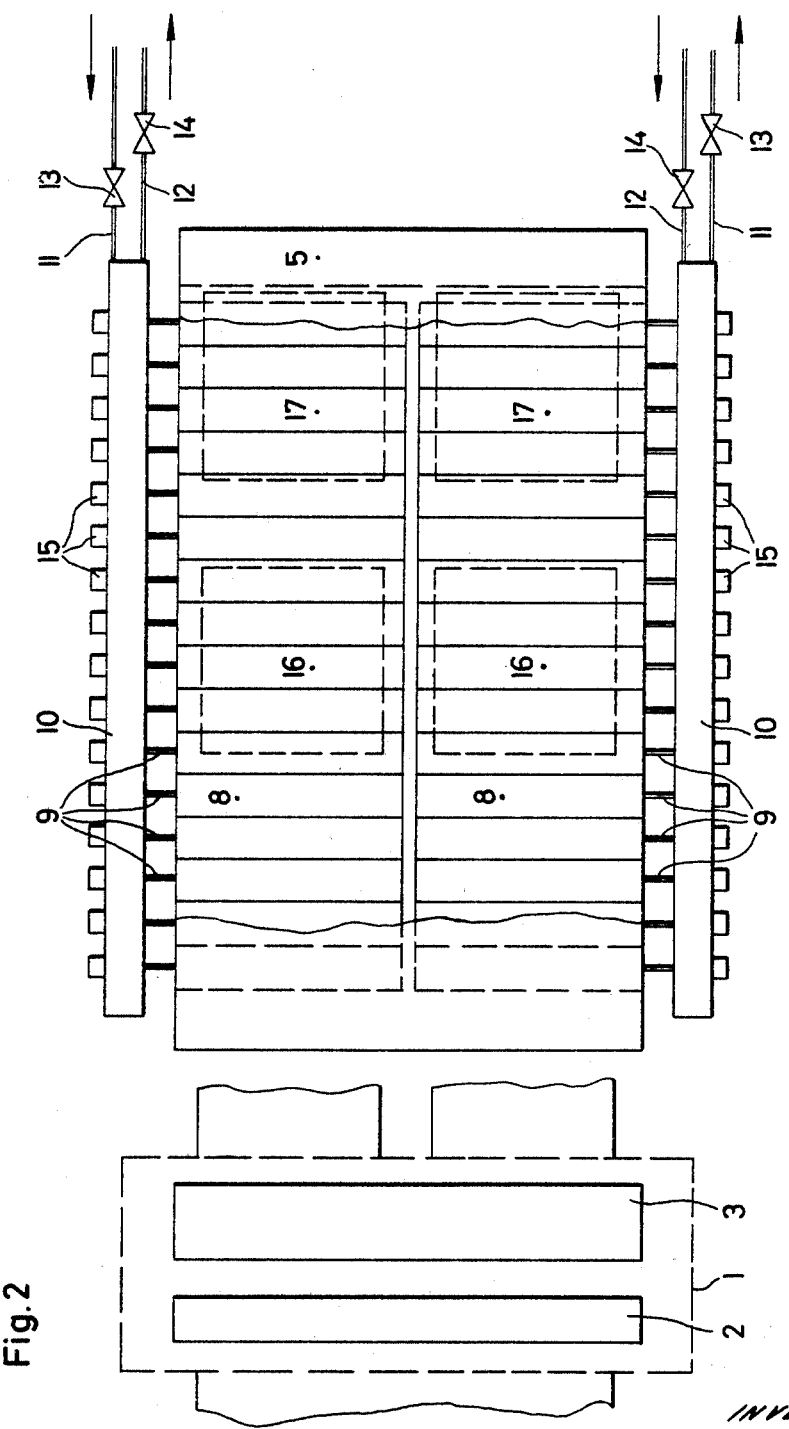
FIGURE 2 is a top view of the conveying device of FIG. 1.

The arrangement of FIG. 1 shown in top view in FIG. 2 illustrates how by means of the conveyor belt 5 it is possible to effect a depositing operation on different depositing tables 16 and 17. The boxes 8 extend over half the width of the conveyor belt 5 and by means of the control device 10 are each individually controllable with regard to the respective desired air pressure. This brings about the advantage that, for instance, one-half of the conveyor belt 5 will convey to and deposit on a depositing table 16 located in the center, whereas the other half of the conveyor belt 5 will convey to and deposit on a depositing table 17.

Figure 3:
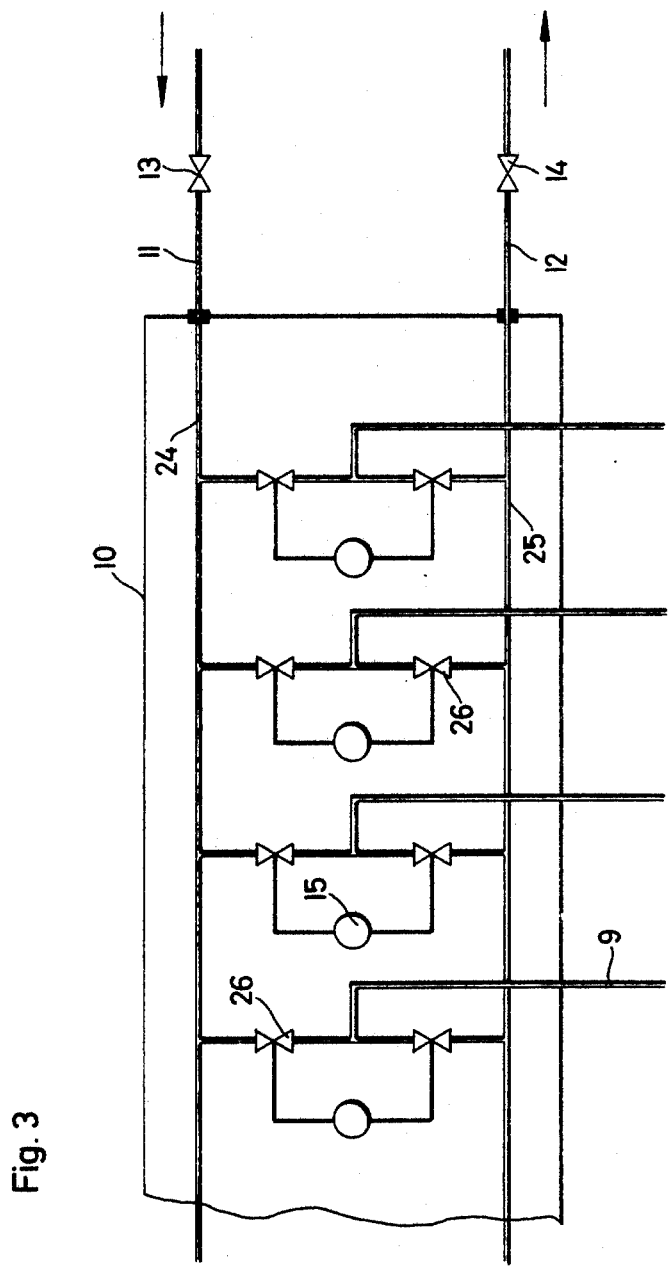
FIGURE 3 illustrates on a larger scale than FIGS. 1 and 2, a control device for controlling the air pressure in the boxes of the conveying device of FIG. 1.

FIG. 3 illustrates on an enlarged scale the control device 10 of FIG. 1. The control device 10 has one connection each 11, 12 respectively for suction air and compressed air. The connections 11 and 12 are provided with valves 13, 14. Conduits 24 and 25 communicate with the connections 11 and 12 respectively. The conduits 24 and 25 are arranged in the interior of the control device 10 and have connections (not designated further) for valves 26. The valves 26 may alternately be turned on by means of the actuating handles 15 pertaining thereto. This brings about that each of the boxes 8 can be operated either with suction air, with compressed air, or without any differential pressure with regard to the normal pressure.

Figure 4:
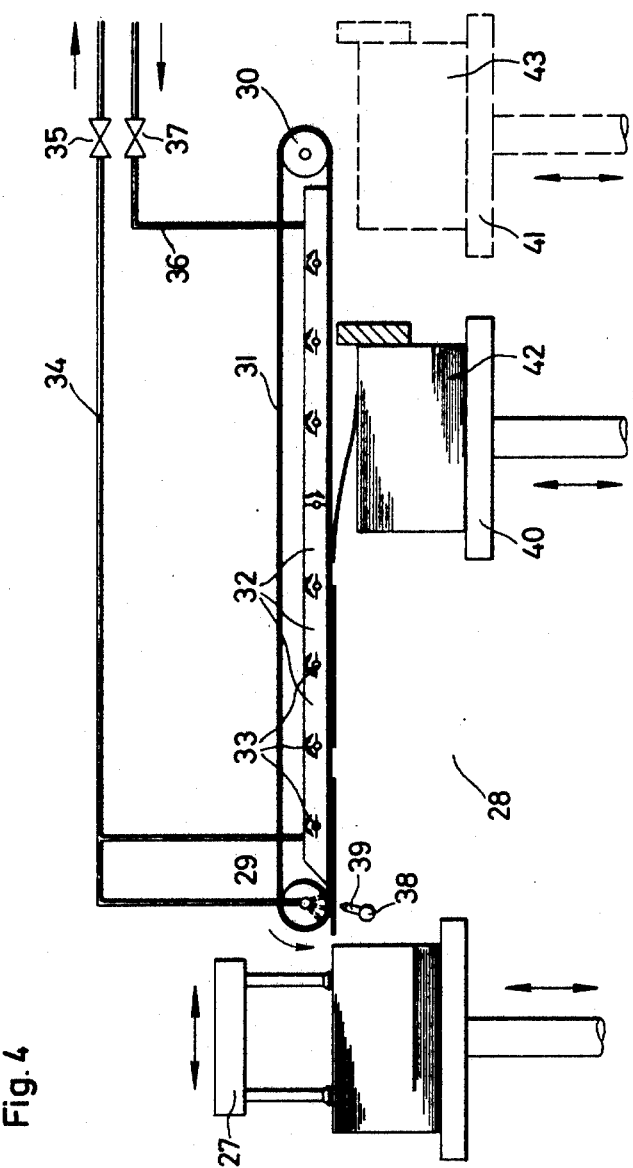
FIGURE 4 illustrates a conveying device modified over that of FIG. 1 inasmuch as it provided with boxes of variable sizes for conveying and depositing of sheets.

FIG. 4 illustrates a further advantageous embodiment of the invention. According to this embodiment the sheet furnishing machine is a so-called sheet feeder 27 by means of which one or more stacks of sheets are in conformity with features or sizes divided into separate stacks 42 and 43 located on depositing tables 40. Adjacent said sheet feeder 27 there is provided a conveying device 28 which is arranged above the transporting plane of the sheets 23. The conveying device 28 comprises rollers 29 and 30 operable to move a conveyor belt 31 in the designated direction.

The conveyor belt 31 is air permeable and moves with its lower strand within the range of boxes 32. The boxes 32 are by means of flaps or the like 33 forming the partitions between the boxes connectable to each other. The flaps 33 are, for instance, individually adjustable by hand. Those boxes 33 which represent the front boxes and looking in the conveying direction are in conformity with FIG. 4 subjected to an underpressure through a conduit 34 and a valve 35, whereas the rear boxes 33 are through a conduit 36 and a valve 37 subjected to an overpressure.

The operation of the arrangement shown in FIG. 4 is as follows: The sheets 23 which are intermittently fed by the sheet feeder 27 are conveyed to the roller 29 of the conveying device 28. The roller 29 is provided with openings (not further designated) and is subjected to an underpressure. For purposes of a better transfer of the sheets 23, a blow pipe 38 with nozzle 39 may be provided. In this instance, a sheet 23 is pulled not only onto the roller 29, but is additionally by means of the blow pipe 38 and nozzle 39 pressed against said roller 29. In this way a safe transfer of each sheet 23 to the conveying device 28 will be assured. The conveyor belt 31 moves over the boxes 32 in the designated direction. In view of the one closed flap 33 approximately in the center of the conveying device, an underpressure exists in the front boxes 32 whereas an overpressure exists in the rear boxes 33.

In view of the underpressure in the front boxes 32, the sheets 23 are held fast on the conveyor belt 31 and are conveyed. When the sheets 23 pass into the range of the boxes 32 subjected to an underpressure, they are lifted off from the conveyor belt 31 and slide onto the stack 42 on the depositing table 40. By adjusting the corresponding flaps 33 it is possible in a simple manner to deposit the sheets 23 on another depositing table 41.

The conveying device according to FIG. 4 has the advantage that each time only one pressure or conduit is necessary for operating the conveying device. Merely by adjusting the flaps 33 it is possible to adapt the device to the particular circumstances prevailing, and in particular to the location of the depositing tables.

Figure 5:
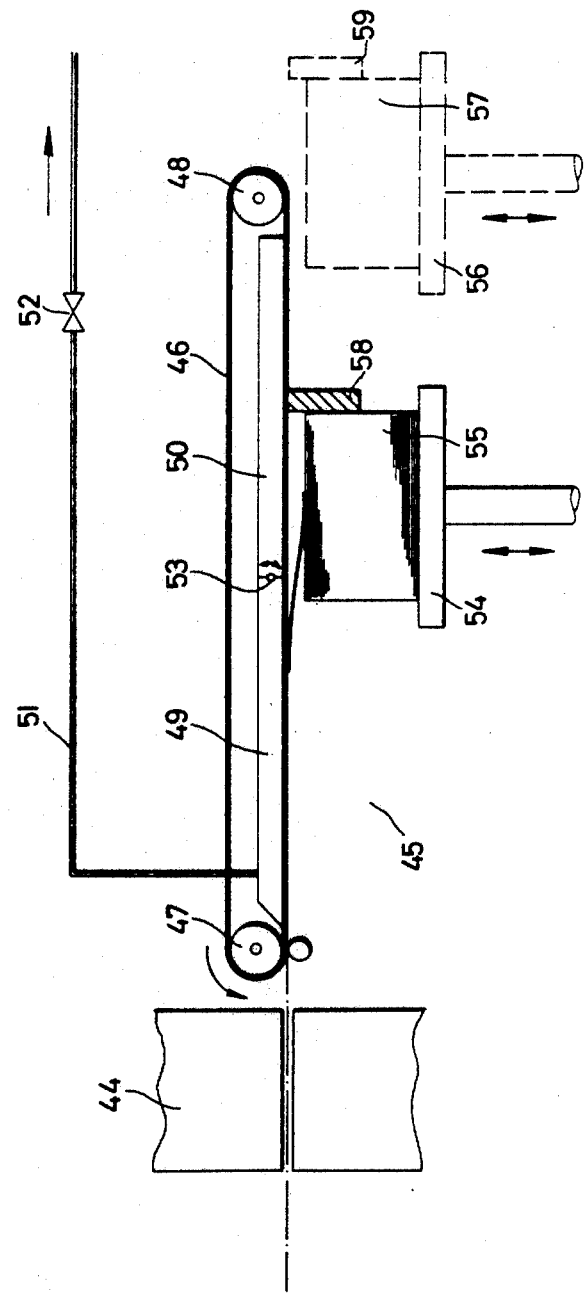
FIGURE 5 represents a simplified conveying device according to the invention for conveying and depositing sheets.

FIG. 5 shows a further embodiment of the invention. More specifically, FIG. 5 diagrammatically illustrates a stamping press 44 forming the sheet furnishing machine. Close to the ejecting station of the press 44 for the sheets 23 there is provided a conveyor 45. This conveyor comprises an air permeable conveyor belt 46, rollers 47 and 48 and boxes 49 and 50. The boxes 49 and 50 are arranged close to the inner side of the lower strand of the conveyor belt 46. The box 49 is through a conduit 51 and a valve 52 connected to a source of air under suction. Between the boxes 48 and 50 there is provided a partition in the form of a turnable flap 53 or the like. When looking in the conveying direction, behind the flap 53 and below the conveyor belt 46 there is provided a depositing table 54 with a stack 55 of sheets 23. Behind the roller 48 there is shown in dash lines a further depositing table 56 with a stack 57. The tables 54 and 56 are provided with abutments 58 and 59 respectively for the sheets 23.

The operation of the arrangement according to FIG. 5 is as follows: The sheets 23 are by the press 44 conveyed to the conveyor 45. The sheets 23 adhere to the respective portion of the conveyor belt 46 as long as said portion is within the range of the box 49. In view of the box 50 separated from the box 49, no underpressure prevails in box 50 so that a sheet 23 after having passed the partition or flap 53 between the two boxes 49 and 50 will due to its own weight fall off the conveyor belt 46. Each sheet 23, therefore, moves at a certain speed toward the stack 55 on the depositing table 54. The movement of a sheet 23 in conveying direction is limited by the abutment 58.

In order to assure a uniform success during the depositing operation, it is necessary that as depositing tables there are employed tables which are adjustable as to height by mechanical, electrical or hydraulic means so that the depositing of the sheets will be effected always under uniform conditions.

If it is desired to stack the sheets on the depositing tables 56, the flap 53 is moved into its horizontal position indicated by dash lines whereby the boxes 49 and 50 are connected to each other. The underpressure in boxes 49 and 50 brings about that the sheets 23 are conveyed by the conveyor belt 46 to the roller 48 and only there are deposited upon the depositing table 56. In this way it will be possible to convey the sheets to another depositing table without necessitating an interruption of the operation of the sheet furnishing machine as has always been the case with heretofore known conveying devices.

FIG. 6 illustrates a device for holding, conveying and sorting sheets of paper, cardboard, metal foils, or the like. This device comprises guiding rollers 60 which feed the webs of paper, cardboard, metal foils, or the like to a checking device 61. The checking device 61 is according to the particular embodiment shown in FIG. 6 arranged on both sides of the web 100. The checking device checks the movable web 100 for instance by electro-optical means. In this way, holes, discolorations or other non-uniformities of the web 100 can be ascertained. Checking device 61 is through a conductor 62 electrically connected to a delay device 63.

When looking in feeding direction, behind the checking device there is arranged a sheet furnishing machine, for instance in the form of a transverse cutter 1 with drawing-in rollers 2 and cutter rollers 3. From the transverse cutter 1 a line 64 likewise leads to the delaying device 63. Adjacent the transverse cutter 1 there is provided a conveyor 76 which is similar to the conveyor of FIG. 1. The conveyor 76 primarily comprises a conveyor belt 65 and rollers 66 and 67. Above the inner side of the lower strand of the conveyor belt 65 there is provided a plurality of boxes 68 which through conduits 69 are connected to a control device 70. The control device 70 is equipped with connections 71 and 72 with valves 73 and 74 respectively for air under suction and air under pressure. A control line 75 leads from the delaying device 63 to the control device 70.

Below the conveyor 76 there are arranged depositing tables 77 and 78 on which stacks 79 and 80 are located. For purposes of precisely aligning the sheets 23, abutments 81 and 82 are provided adjacent said stacks 79 and 80.

FIG. 7 shows a top view of the arrangement according to FIG. 6.

FIG. 8 illustrates on an enlarged scale a portion of the control device 70. More specifically, the control device 70 comprises conduits 83 and 84 connected to connections 71 and 72 respectively leading to a source of suction air and a source of compressed air. The conduits 69 are through valves 85 connectable to one or the other of the two conduits 83, 84. The valves 85 are controlled by means of magnets 86 which are connected to the control line 75.

The operation of the device illustrated in FIGS. 6 to 8 is as follows: The web 100 is by means of guiding rollers 60 conveyed to the checking device 61. Depending on the faults on web 100, as for instance holes, discolorations, or the like, the checking device 61 emits impulses through line 62 to the delaying device 63. The web 100 is cut into sheets 23 by the transverse cutter 1.

As long as the web 100 is free from faults, the sheets 23 cut by the transverse cutter 1 are conveyed by the conveyor 76 for instance to one of the two adjacent depositing tables 77 and are deposited thereon. In this instance the boxes 68 are over the inner side of the lower strand of the conveyor belt 65, when looking in the feeding direction, subjected to suction air up to the front edge of the stack or stacks 79 and thereafter are subjected to compressed air. The control of the pressure in the boxes 68 is effected by means of the control device 70 with the valves 85 and the magnets 86. The control of the magnets 86 is effected by the delaying device 63 through the intervention of the control line 75. When faults occur in the web 100, the checking device 61 emits corresponding impulses. The impulses are by means of the delaying device 63 delayed until the sheet 23 containing the fault or faults comes into the range of the respective depositing station pertaining thereto, for instance within the range of the depositing table 78. In this way it will be assured that the sheets which preceding the faulty sheet are conveyed by the conveyor belt 65 will be deposited upon the depositing table 77 intended for the good sheets. As soon as the sheet has been deposited which precedes the faulty sheet, the boxes 68 are through conduits 69 connected to suction or compressed air in such a way that the respective faulty sheet 23 is conveyed to the front edge of the stack 80 and only there in view of the adjacent boxes 68 subjected to an overpressure is deposited upon the stack 80. The control of the pressure in the boxes 68 is so effected that the good sheet following the faulty sheet will again be deposited on the stack 79. For controlling the magnets 86, electrical connections known per se may be employed as they are well familiar to anybody skilled in the art.

The purpose of the delaying device 63 consists in delaying the impulses emitted by the checking device 61 in view of ascertained faults in web 100, until the corresponding faulty sheet has reached the respective stack 80. Inasmuch as the time of delay depends on the feeding speed, the delaying device 63 is through a line 64 connected to the transverse cutter 1. Through the line 64, impulses or the like are in conformity with the speed of the transverse cutter conveyed to the delaying device 63 for controlling the length of the delaying time.

By means of the valves 73 and 74 in the connections 71 and 72 respectively, the magnitude of the underpressure and overpressure in the boxes 68 can be controlled.

With the corresponding size of the conveying device it is possible to deposit the sheets not only on one or the other of two depositing stations but it is also possible in a simple manner to deposite the sheets by means of the same conveyor belt at more than two stations. To this end, it is merely necessary that the checking device will in conformity with the number or magnitude of the faults emit different types of impulses, impulse sequences, or the like, which are employed in a corresponding manner for controlling the boxes 68. By means of such a conveying device it is also possible to sort sheets according to different quality classes. The sorting operation will relate to each sheet individually which means that each sheet will be deposited at the proper station in conformity with its quality. Thus, for instance, of two adjacent sheets on the belt 65, one of the sheets may be deposited on a depositing table for good sheets whereas the other sheet may be deposited on a table for faulty sheets.

FIG. 9 illustrates a conveying device by means of which the sheets are conveyed either on one strand or on the other strand of the conveyor belt. The checking of the sheets is effected on the conveyor belt.

The arrangement of FIG. 9 comprises rollers 60 which feed the sheets 23 to the conveying device 87 which latter comprises primarily a conveyor belt 88 and rollers 89 and 90. Below the upper strand or above the lower strand there are boxes 91 and 92 which through a conduit 93 communicate with a valve 94 which in its turn is connected to a source of air under suction. The roller 90 is likewise air permeable and connected to a source of air under suction. In the interior of the roller 90 there is provided a segment 95 covering a portion of the mantle surface of roller 90 against the effect of suction air. Behind or below the conveying device 87 there are provided depositing tables 96 and 97 with stacks 98 and 99 thereon. For purposes of precisely aligning the sheets 23 there are again provided abutments 101 and 102 respectively. Opposite the segment 95 and slightly spaced from the roller 90 there is provided a blow pipe 103 with nozzles 104a. The blow pipe 103 is through a conduit 104 and a valve 105 connected to a source of compressed air. Valve 105 is controlled by means of a magnet 106 which through a control line 101 is connected to a delaying device 108. The delaying device 108 is on one hand through a line 109 connected to the checking device 110 and on the other hand through a line 111 is connected to the roller 89 or an impulse emitter or the like arranged on roller 89 and not shown in the drawings.

The operation of the conveying device shown in FIG. 9 is as follows: The sheets 23 furnished by a non-illustrated machine are by means of rollers 60 conveyed to the conveying device 87. The sheets 23 pass onto the upper strand of the conveyor belt 88 of the conveyor 87 and pass by the checking device 110. The checking device 110 is adapted for instance by electro-optical means to ascertain faults in the sheets 23 and to emit corresponding impulses or the like.

When a sheet 23 is faultless, it passes on the upper strand of the conveyor belt 88 to the roller 90 and into the range of the segment 95. At this portion of the roller 90 no underpressure exists so that the sheet will be lifted off from the roller 90 or conveyor belt 88 and will pass onto the stack 99 and against the abutment 101. If, however, a faulty sheet moves into the range of the checking device 110, the latter will emit corresponding impulses through the delaying device 108 to the magnet 106. The impulse or impulses are delayed by the delaying device 108 until the front edge of the respective sheet 23 will be within the range of the blow pile 103 or the segment 95 of roller 90. At this time, value 105 is opened so that compressed air will through blow pipe 103 and nozzles 104a blow against the respective sheet 23. This compressed air will prevent the respective sheet 23 from being lifted off the roller 90 or conveyor belt 88. As a result thereof, the sheet 23 will again pass into the range of that portion of roller 90 which is under the influence of an underpressure, and the said sheet 23 will be held fast by the conveyor belt 88 and will be further conveyed whereupon it passes into the range of box 92 which is likewise under the influence of an underpressure.

In the box 92 there is provided a rotatable flap or the like 112 shown in closing position. This brings about that only that portion of the box 92 which in feeding direction is the front portion will be subjected to an underpressure. Consequently, a faulty sheet will be conveyed into the range of flap 112 and will then drop off the conveyor belt 88 while sliding onto the stack 98 on the depositing table 96 and against the abutment 102.

By providing the flap 112 it is possible to deposit sheets also at the end of box 92.

The delaying device 108 serves the purpose of delaying the impulses for the magnets 106 of valve 105 until the respective faulty sheet is within the range of the blow pipe 103. Instead of the stationary segment 91, it is also possible to employ a segment which is movable in or against the conveying direction or the direction of rotation of roller 90. The drive of the segment may be controlled similar to the blow pipe by compressed air through the checking device 110 so that a faulty sheet can also without the intervention of blown air be passed around the roller 90 in view of the suction exerted by the roller 90. To this end the segment 95 may be briefly turned either about its own angle counter to the direction of the roller 90 or in the direction of rotation of the roller 90 by one revolution approximately at the speed of rotation of the roller 90.

The conveying device illustrated in FIG. 9 is, however, suitable only for paper foils or the like which are easily flexible.

FIG. 10 represents a further conveying device which will also permit the conveying and sorting of sheets of stiff material, as for instance cardboard.

FIG. 10 diagrammatically illustrates a transverse cutter 1 with drawing-in rollers 2 and cutter rollers 3. Adjacent the transverse cutter 1 there is provided a conveying device 113 which comprises primarily the conveyor belts 114 and 117 passing over rollers 115, 116 and 118, 119 respectively. Below the lower strand of the conveyor belt 114 there is provided a box 120. Below the lower strand of the conveyor belt 117 there is a box 121. The box 120 is adapted through a conduit 122 and a valve 123 to communicate with a source of air under suction. The box 121 is adapted through a conduit 124 and valve 125 like wise to communicate with a source of air under suction. Furthermore, there are illustrated depositing tables 126, 127 and 128, with stacks 129, 130 and 131 respectively. The depositing tables 126, 127 and 128 are respectively equipped with abutments 132, 133 and 134. In box 121 there is provided a rotatable flap or the like 135 which is connected to a magnet or the like 136. Valve 125 is connected to a magnet 137. Above the upper strand of the conveyor belt 114 there is provided a checking device 138 which through a line 139 is connected to a delaying device 140. A further line 141 leads from the roller 150 likewise to the delaying device 140. The magnet 137 is through a line 142 connected to the delaying device 140 while the magnet 136 is connected to a line 143 with the delaying device 140.

The operation of the device shown in FIG. 10 is as follows: the sheets 23 cut off from the web 100 by the transverse cutter 1 are fed to the roller 115 in such a way that the sheets 23 pass onto the upper strand of the conveyor belt 114. In box 120 an underpressure exists so that the sheets 23 are held fast on the conveyor belt 114 and are being conveyed. The sheets 23 move past the checking device 138 which emits impulses in conformity with the faults in sheets 23. Faultless sheets are conveyed on the upper strand of the conveyor belt 114 to the roller 116 and are then deposited onto the stack 129 on table 126. If, however, a faulty sheet moves into the range of the checking device 138, the latter will through the delaying device 140 send an impulse or the like to the magnet 137 which will then open the valve 125 so that the box 121 will be subjected to an underpressure. Consequently, the faulty sheet is drawn onto the lower strand of the conveyor belt 117 and by the latter is conveyed further. In the particular instance shown in FIG. 10, the respective faulty sheet 23 is deposited on the depositing table 127.

However, it is also possible by adjusting the flap 135 to subject the entire box 121 to an underpressure so that a sheet 23 will in this instance be deposited onto the stack 131 of the depositing table 128. This may be advantageous when the sheets are to be sorted in conformity with various classes of quality. Depending on the number and the type of the faults in a sheet, either the valve 125 is actuated or in addition to said valve also the flap 135 is actuated. In this way it is possible, for instance, to divide the sheets into three different classes of quality.

The purpose of the delaying device 140 consists in emitting the impulse for controlling the magnet 136 or the magnet 137 at a suitable time. Through line 141, the delaying time of the delaying device 140 is controlled in conformity with the speed of the roller 115 or the speed of the conveyor belt 114.

Instead of the solutions shown in the drawings, the checking device for the sheets may also be arranged on a sheet feeder similar to that of FIG. 4. In this instance it is advantageous to previously provide faulty sheets with a marking which is to be placed on the respective sheets on an area which will be opposite to the checking device on the sheet feeder when taking sheets off a stack for purposes of sorting.

FIG. 11 illustrates on an enlarged scale a conveyor belt 144 passing over a roller 145. Above the lower strand of conveyor belt 114 there is provided a box 146 with rotatable flaps or the like 147. Box 146 is through a conduit 148 and a valve 149 connected to a source of air under suction. Within the range of a depositing table 150 with a stack 151 and above the box 146 there is provided a container 152 equipped with rotatable flaps or the like 153. These flaps 153 form a portion of the partition between the container 152 and the box 146. For purposes of precisely aligning the sheets 23 there is provided an abutment 154.

Below the lower strand of the conveyor belt 144 there is provided a further conveyor belt 155 which passes over rollers 156 and 157. The upper strand of the conveyor belt 155 moves approximately at the level of the uppermost sheet of the stack 151 in the direction indicated by an arrow. The roller 157 is close to the front edge of the stack 151.

The operation of the device shown in FIG. 11 is as follows: When a sheet 23 moves into the range of the stack 151, for instance, the flap 147 arranged at the front edge of container 152 is moved into the position shown in dash lines, and one or more flaps 153 are moved into the vicinity of the front portion of the container 152 into the position shown in dash lines. Consequently, compressed air passes from the container 152 into that portion of box 146 which is below said container 152. The compressed air moves in the form of a pressure wave from the front end to the rear end of box 146 when looking in feeding direction. As a result thereof, the rear end 8 of the respective sheet 23 is detached from the conveyor belt 144 and drops against the upper strand of the conveyor belt 155. The front edge of the respective sheet 23, however, will further adhere to the conveyor belt 144 due to the pressure wave in box 146 which moves only at a certain speed and due to the underpressure decreasing correspondingly. The sheet 23 will, therefore, be pulled close to the end of the stack 151 and will only there fully drop onto the stack 151. Since the conveyor belt 155 rotates at a lower speed than the conveyor belt 144, the dropping sheets are braked. As a result thereof, a proper depositing of the sheets on the stack 151 will be possible. The conveyor belt 155 conveys the sheets 23 further onto the depositing table 150. Also in this instance it is necessary that the depositing table 150 is adjustable as to its height so that the depositing of the sheets can be effected always under the same conditions. If it should happen that a sheet has not been moved completely against the abutment 154, the next sheet sliding onto the stack will move the last deposited sheet due to sliding friction against the abutment 154 so that also with this design a proper depositing even of sensitive sheets of paper or the like will be assured. The respective flaps 147, 153 are controlled by a device not shown which when a sheet moves into the range of the depositing table will emit an impulse or the like. Such a device may, for instance, be a device which by photoelectric means will scan the conveyor belt 144 as to the presence of sheets. Depending on the type of the material of the sheets, more or less flaps 153 may be opened or closed. The container 152 will be supplied with compressed air through the conduit 158 and valve 159. In view of the large storage capacity of this container 152, a fast distribution of the pressure in the respective portion of the box 146 is possible.

What is claimed is:

1. A device for transporting and depositing sheet-like members which comprises; a pervious conveyor belt having horizontal reaches, box means disposed over at least the lower reach of said belt and open toward the belt so pressure conditions in said box means will influence the pressure conditions on the other side of the belt, means for connecting said box means to a source of suction, and supply means for supplying sheet-like members to the lower reach of said belt to be held thereon by the suction on the belt due to said box means so the members will move with the belt, said belt being a screen cloth and comprisng metal elements to drain off static from said member.

2. A device according to claim 1 in which said supply means includes an endless conveyor element extending beneath one end of the lower reach of said belt in parallel closely spaced relation thereto so members can be transferred from the end of said conveyor element to said belt.

3. A device according to claim 2 which includes control means to control the suction in the boxes along the belt in the range of the end of said conveyor element for selectively transferring members from the element to the belt, and a receiving station adjacent the end of said element to receive therefrom the members not transferred to said belt.

4. A device according to claim 3 which includes a scanning station over said conveyor element for scanning said members before they pass beneath said belt, and said control means being connected to said scanning means for control thereby in conformity with the measured quality of the respective members.

5. A device for transporting and depositing sheet-like members which comprises; a pervious conveyor belt having horizontal reaches, box means disposed over at least the lower reach of said belt and open toward the belt so pressure conditions in said box means will influence the pressure conditions on the other side of the belt, means for connecting said box means to a source of suction, supply means for supplying sheet-like members to the lower reach of said belt to be held thereon by the suction on the belt due to said box means so the members will move with the belt, said box means being in the form of a unitary housing, and valve members in said housing forming the partitions between said box means and movable to vary the number of box means which are subjected to suction.

6. A device according to claim 5 which includes a source of air under pressure and in which at least the box means within the range of said receiving station means is provided with connections with said source of air under pressure, and said valve members for admitting pressure to said box means are within the range of said receiving station means to expel members from said belt into said receiving station means.

7. A device for transporting and depositing sheet-like members which comprises; a pervious conveyor belt having horizontal reaches, box means disposed over at least the lower reach of said belt and open toward the belt so pressure conditions in said box means will influence the pressure conditions on the other side of the belt, means for connecting said box means to a source of suction, supply means for supplying sheet-like members to the lower reach of said belt to be held thereon by the suction on the belt due to said box means so the members will move with the belt, said box means comprising a plurality of individual boxes in side by side relationship, a source of air under pressure, connection from each of said source of air under pressure and said source of suction to each of said boxes, and valves in said connections for controlling the movement of air therethrough.

8. A device according to claim 7 in which said valves are magnetically operable and said device includes a checking station for checking the quality of said members, said checking station providing impulses in conformity with the quality of the respective members, said magnetic valves being controlled by said impulses to determine the point where the members are released from said belt.

9. A device according to claim 8 in which said checking station comprises delay means which delay the supply of impulses to said magnetic valves in conformity with the length of time required for the checked member to travel from the checking station to the point of release thereof from said belt.

10. A device according to claim 9 in which said delay means is under the control of said belt so as to vary the amount of delay provided in conformity with the speed of said belt.

11. A device for transporting and depositing sheet-like members which comprises; a pervious conveyor belt having horizontal reaches, box means disposed over at least the lower reach of said belt and open toward the belt so pressure conditions in said box means will influence the pressure conditions on the other side of the belt, means for connecting said box means to a source of suction, supply means for supplying sheet-like members to the lower reach of said belt to be held thereon by the suction on the belt due to said box means so the members will move with the belt, receiving station means beneath the lower reach of the belt past which the belt moves, means for reducing the degree of suction in the box means within the range of said receiving station means to drop members from the belt into said receiving station means, said members being supplied by said supply means to the upper reach of said belt, a perforated roller about which the belt passes from the upper reach to the lower reach of the belt, and means for subjecting said roller to suction to cause members on the upper reach of the belt to pass around said roller to the lower reach of the belt.

12. A device according to claim 11 in which said receiving station means comprises at least two stations past which said belt moves, a checking station for scanning the members before they reach said receiving station means to check at least one quality of the members, and means under the control of said checking station for reducing the degree of suction in said box means in the range of a respective one of said stations to drop a respective member in the station which pertains to the measured quality thereof.

13. A device according to claim 12 in which the said checking station includes delay means so that the reduction in the degree of suction in the box means at the respective station coincides with the arrival of the measured member at the station.

14. A device according to claim 11 in which said box means is in the form of boxes in side by side relation and the dimension of each said box in the direction of travel of said members is only a fraction of the length of a said member.

15. A device according to claim 11 in which said supply means comprises a sheet feeder for supplying said members to said belt, and a checking station scanning the members on said sheet feeder and operable for controlling the suction in said box means to determine the point of release of the respective members from said belt.

16. A device according to claim 11 in which a segment is provide in said roller displaceable therein mask off a portion of the circumference of said roller from the suction therein.

17. A device according to claim 16 which includes a nozzle means outside the roller directed toward said portion of the circumference of said roller, and conduit means for supplying air under pressure to said nozzle means to direct a jet of air against the roller to hold the said members on the belt while it passes over said portion of the circumference of the roller.

18. A device according to claim 16 which includes a scanning station following the supply means for scanning said members to ascertain at least one quality thereof, and valve means in said conduit means under the control of said scanning station for selective supply of air under pressure to said nozzle means in conformity with the said quality of said members.

19. A device for transporting and depositing sheet-like members which comprises; a pervious conveyor belt having horizontal reaches, box means disposed over at least the lower reach of said belt and open toward the belt so pressure conditions in said box means will influence the pressure conditions on the other side of the belt, means for connecting said box means to a source of suction, supply means for supplying sheet-like members to the lower reach of said belt to be held thereon by the suction on the belt due to said box means so the members will move with the belt, receiving station means beneath the lower reach of the belt past which the belt moves, means for reducing the degree of suction in the box means within the range of said receiving station means to drop members from the belt into said station means, said box means comprising a first elongated compartment adjacent said belt extending over said receiving station means and having a closed end means, at the end of said receiving station means there being a second compartment in the range of said receiving station means on the opposite side of said first compartment from said belt, flap means distributed along the length of said first compartment and selectively rotatable to isolate the portion of the first compartment from the closed end thereof to the rotated flap means from the remainder of the first compartment, further flap means distributed along the juncture of said first and second chambers selectively rotatable into position to connected said second chamber with the first chamber, and a source of air under pressure connected to said second chamber.

20. A device according to claim 19 which includes braking means located ahead of the receiving station means and operable for braking the movement of members released from said belt to said receiving station means.

21. A device according to claim 20 in which said braking means comprises a further belt having its upper reach beneath the lower reach of the conveyor belt so members released from the conveyor belt will engage said further belt, said further belt running at a slower speed than said conveyor belt, said receiving station means receiving said members at about the level of the upper reach of said further belt.

References Cited

UNITED STATES PATENTS

| | | | |
|---|---|---|---|
| 2,813,637 | 11/1957 | Perry | 271—64 X |
| 3,118,665 | 1/1964 | Thompson | 209—75 X |
| 3,123,354 | 3/1964 | Ungerer | 271—74 |
| 3,227,275 | 1/1966 | Cody | 271—74 X |

RICHARD A. SCHACHER, Primary Examiner

U.S. Cl. X.R.

271—64, 74